(12) United States Patent
Wefers et al.

(10) Patent No.: US 8,806,423 B2
(45) Date of Patent: Aug. 12, 2014

(54) SYSTEM AND METHOD FOR ESTIMATING SCOPE AND EFFORT OF SOFTWARE DEPLOYMENT

(75) Inventors: Marcus Wefers, Heidelberg (DE); Stefan Berndt, Speyer (DE)

(73) Assignee: SAP AG, Walldorf (DE)

( * ) Notice: Subject to any disclaimer, the term of this patent is extended or adjusted under 35 U.S.C. 154(b) by 111 days.

(21) Appl. No.: 13/616,539

(22) Filed: Sep. 14, 2012

(65) Prior Publication Data

US 2014/0082583 A1    Mar. 20, 2014

(51) Int. Cl.
*G06F 9/44* (2006.01)

(52) U.S. Cl.
USPC ............ 717/101; 717/102; 717/104; 717/120

(58) Field of Classification Search
CPC .............................................. G06F 8/70–8/77
See application file for complete search history.

(56) References Cited

U.S. PATENT DOCUMENTS

| | | | |
|---|---|---|---|
| 7,640,531 B1 * | 12/2009 | Akram et al. ................. | 717/101 |
| 7,849,438 B1 * | 12/2010 | Hemmat et al. .............. | 717/102 |
| 2005/0216879 A1 * | 9/2005 | Ruhe ............................ | 717/101 |
| 2008/0313595 A1 * | 12/2008 | Boulineau et al. ........... | 717/101 |
| 2010/0058287 A1 * | 3/2010 | Sundararajan et al. ....... | 717/104 |
| 2010/0153908 A1 * | 6/2010 | Sarkar et al. .................. | 717/104 |
| 2011/0016447 A1 * | 1/2011 | Goel et al. .................... | 717/101 |
| 2011/0314449 A1 * | 12/2011 | Babu et al. .................... | 717/120 |

OTHER PUBLICATIONS

Mohagheghi, Parastoo et al., Effort Estimation of Use Cases for Incremental Large-Scale Software Development, 2005, 9 pages.*
Diev, Sergey, Use Cases Modeling and Software Estimation: Applying Use Case Points, 2006, 4 pages.*
Sharma, Ashish et al., Applying Requirement Based Complexity for the Estimation of Software Development and Testing Effort, 2012, 11 pages.*
Xiong, C.J. et al., A Model of Open Source Software Maintenance Activities, 2009, pp. 267-271.*
Gethers, Malcom et al., Integrated Impact Analysis for Managing Software Changes, 2012, pp. 430-440.*
Hassan, Ahmed E. et al., Predicting Change Propagation in Software Systems, 2004, 10 pages.*

* cited by examiner

*Primary Examiner* — Thuy Dao
*Assistant Examiner* — Christopher Franco
(74) *Attorney, Agent, or Firm* — Schwegman, Lundberg & Woessner, P.A.

(57) ABSTRACT

A plan to modify a software system is analyzed to identify objects of a first entity that are affected by the plan. An impact on a first part of the system is determined. Software modifications of a second entity in a second part of the system that are associated with the affected objects of the first entity are identified. Usage statistics of the first entity relating to the affected objects and usage statistics of the second entity relating to the software modifications are identified. An impact of the modifications to the affected objects on the software modifications of the second entity is determined. A first estimate of an effort to implement the modifications to the system is developed. A business blueprint is developed for the second entity. A trace of the affected objects and a trace of software executables are generated. A test plan is generated using the traces.

20 Claims, 6 Drawing Sheets

SYSTEM AND METHOD FOR ESTIMATING SCOPE AND EFFORT OF SOFTWARE DEPLOYMENT

TECHNICAL FIELD

The present disclosure relates to a system and method for estimating the scope and effort involved in deploying software for software fixes and/or software enhancements.

BACKGROUND

In many Information Technology (IT) systems today, a software vendor provides to its customers a standard but complex and extensive software system. The customer can then develop its own software that uses and/or builds upon the software vendor's system. The customer system, which includes the vendor's, standard system and the customer-developed software, can be referred to as the customer's software system landscape, or simply landscape. In some situations, customers have to update their landscape on a regular basis by deploying support packages for software bug fixes and/or software enhancement packages for new functionalities. These support and enhancement packages are normally provided by the software vendor. The deployment of support packages and/or enhancement packages requires a lot of effort by both the software vendor and the customer, an effort that is difficult to estimate before the support package or enhancement package is deployed in the customer system.

DETAILED DESCRIPTION

Figure 1:
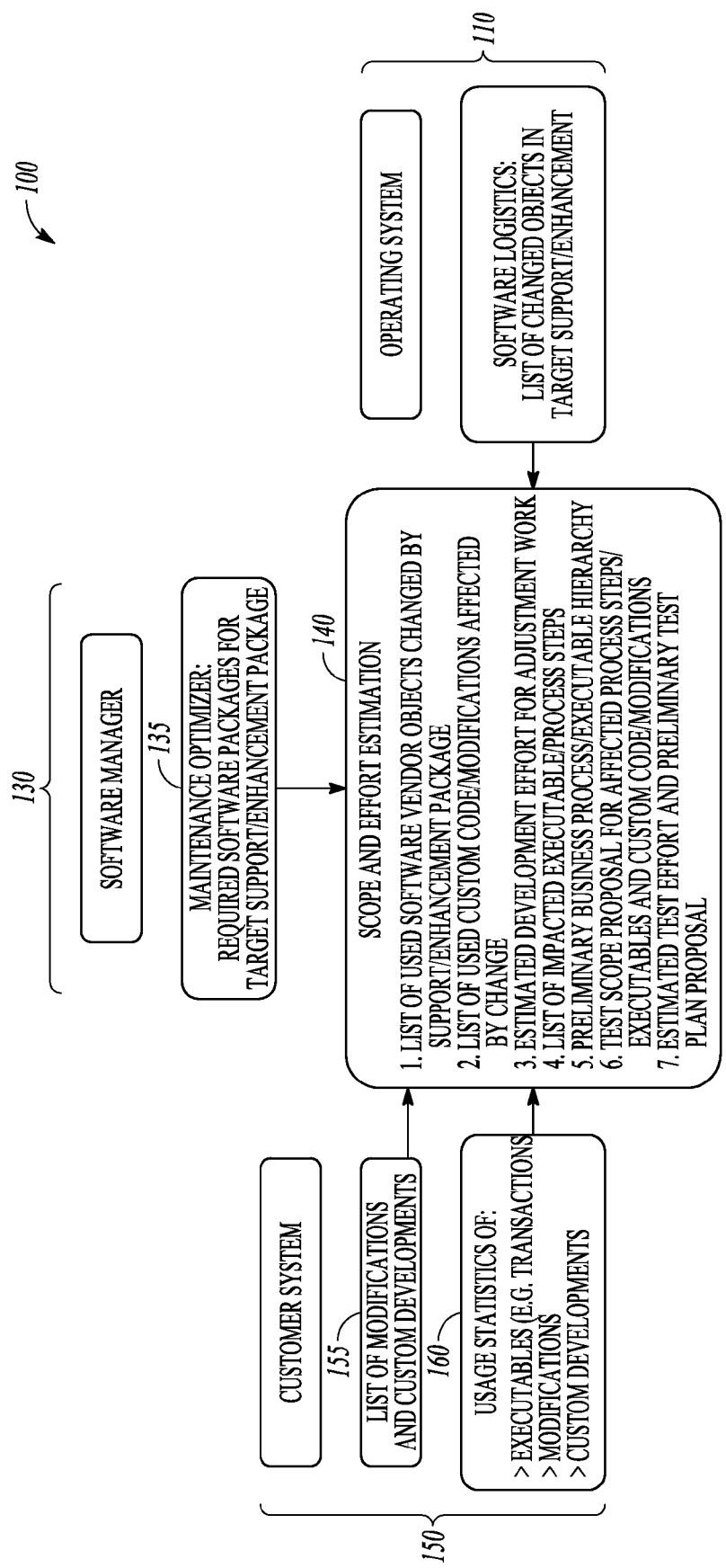
FIG. 1 is a block diagram of an embodiment of a system that estimates the scope and effort involved in the deployment of a software support package and/or a software enhancement package.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Software customers would benefit from knowing the scope of activities and the effort involved in deploying software support packages and/or software enhancement packages before the physical deployment of such packages. In many Information Technology (IT) landscapes, customers do not know the extent of the deployment effort. Consequently, many customers delay important support and enhancement deployments because of this lack of know-how about the required effort. Customers could plan their support and enhancement deployments much better if a reliable effort and scope analysis was available to the customer. To be accepted by customers, such an effort and scope analysis should not require customers to perform a labor intensive analysis. Rather, to be accepted by customers, such an effort and scope analysis should be a comprehensive application from the software vendor that requires only minimal input from the customer.

An embodiment addresses the issues involved with software deployment outlined above by estimating the scope and effort of the deployment of a software support package and/or a software enhancement package. The embodiment has the ability to estimate the effort needed for adjustments to a customer's custom code and for adjustments to customer modifications to the software vendor's code (i.e., objects). The embodiment further has the ability to estimate the effort required for regression testing. The embodiment can be used in connection with project planning and/or scope planning for a support package and/or an enhancement package deployment.

In any software support package or software enhancement package deployment, important and time consuming activities can include identification of affected modifications (e.g., by a customer to a software vendor's code) and the resulting required adjustments in the customer system. The reason for this is that support and enhancement packages normally come with updates of the software vendor's standard objects. Additionally, another important and time consuming activity can include identification of the required test scope, test planning, creation of missing test cases (usually on the customer's side), and execution of manual tests.

FIG. 1 is a block diagram of an embodiment of a system 100 to estimate the scope and effort of the deployment of a software support package and/or a software enhancement package. The system 100 includes a software vendor's operating system 110, a software vendor's software management system 130, and a customer system 150. The operating system 110 includes a list of the software vendor's software objects that are affected by the support/enhancement package. This list of affected software objects can be stored in a stack.

The software manager 130 includes a maintenance optimizer 135. The maintenance optimizer 135 includes the required software packages for the support/enhancement package. The software manager 130 handles the estimation of the support and enhancement effort as indicated at 140. Specifically, the software manager 130 receives and stores a list of the software vendor's objects that will be changed by the support/enhancement package. The software manager 130 further includes a list of a customer's custom code and a list of modifications (by the customer to the software vendor's code) that will be affected by the deployment of the support/enhancement package. In general, a customer's custom code is written by the customer and separate from the software vendor's code. The customer's custom code however interacts with the software vendor's code. Customer modifications relate to a customer's modifications to the software vendor's code. Such modifications can be implemented by the software vendor and/or the customer. At least some of this data relating to the custom code and the modifications is received from the customer system 155. Usage statistics for such customer custom code and modifications of vendor code are received from customer system module 160. The software manager 130 further receives an estimated development effort for the adjustment work. This estimate is normally generated by the software vendor, whose software engineers have extensive experience in such support/enhancement deployments. The software manager 130 also receives a list of the customer's impacted executables and process steps, which also can be based on usage statistics from 160. The software manager 130 can also receive from the customer preliminary business processes and an executable hierarchy. Using this information, a test scope proposal is developed for a customer's affected process steps, executables, custom code, and modifications to the software vendor's code. Finally, an estimated test effort and preliminary test plan are proposed. Once again, such an estimate of the test effort and preliminary test plan are developed using the many years of experience of the vendor's software engineers. In an embodiment, all analysis steps are performed in the background after the necessary input data has been provided.

Figure 2:
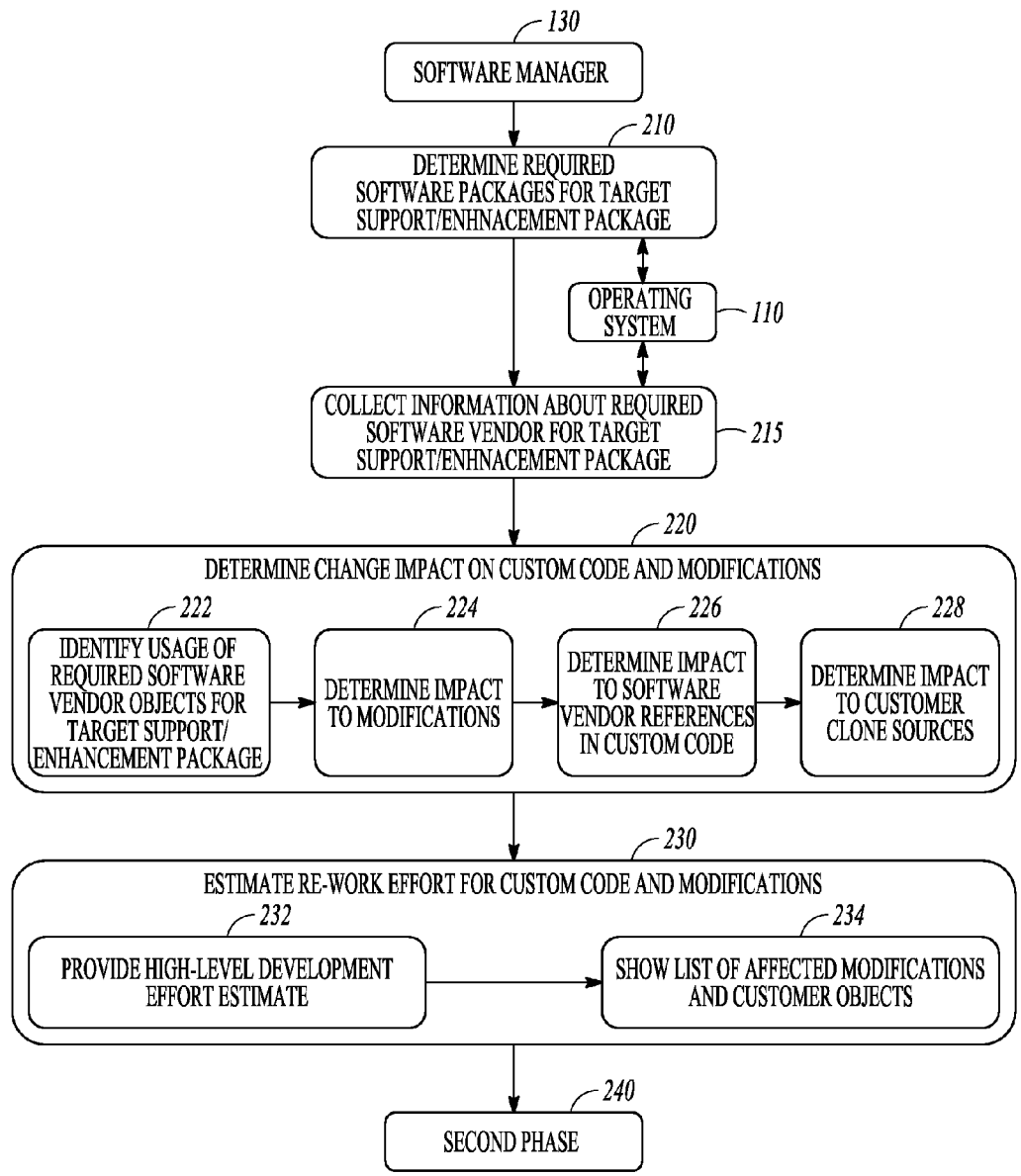
FIG. 2 is a black diagram of a first phase of a system that estimates the scope and effort involved in the deployment of a software support package and/or a software enhancement package.

FIG. 2 is a block diagram of a first phase of a software support and software enhancement scope and effort estimation embodiment. In general, the first phase involves a determination of the impact of the support/enhancement package on a customer's custom code and a customer's modifications to the software vendor's code, and an estimate of the rework effort for the customer's custom code and the customer's modifications to the software vendor's code. As noted, these determinations and impacts are based on the extensive experience of the vendor's software engineers who are involved in such deployments. The estimation effort can be divided into the two phases because different persons from the software vendor and/or the customer may be involved or more interested in different aspects of a deployment. For example, while an IT project leader may be equally interested and involved in both phases, a developer manager may be more interested in phase 1, and a test manager may be more interested in phase 2.

Referring specifically now to FIG. 2, at 210, a determination is made of the software packages that are required for and/or affected by the support/enhancement package. At 215, information is collected about the software vendor's objects that will be affected by the support/enhancement package. At 220, a determination is made regarding the impact on a customer's custom code and the impact on a customer's modifications to the software vendor's code. The determination of the impact on a customer's custom code and a customer's modifications to the software vendor's code involves several steps. At 222, usage statistics are gathered for the software vendor's objects that will be affected by the support/enhancement package. In general, the greater the extent of the usage of software objects in a customer landscape, the greater the effort that will be required in connection with changes to those objects in a support/enhancement deployment. At 234, a determination is made as to the impact that the support/enhancement package will have on modifications that the customer has made to the software vendor's code. At 226, a determination is made as to the impact that the support/enhancement package will have on invocations of the software vendor's code by the customer's custom code. At 228, a determination is made as to the impact of customer clone sources.

Continuing with the first phase of the estimation, at 230, an estimation is made for the effort to rework the customer's custom code and to rework the modifications that the customer has made to the software vendor's code. This estimation, involves at 232 a high level development effort estimate, and at 234, a generation of a list of affected modifications and customer objects.

More specifically, in an embodiment of the first phase, the software vendor defines a support/enhancement stack scope that is based on a current support package level of the software vendor's system and a target support package level of the software vendor's system. The current support package level comprises a list of the support/enhancement packages that the customer has already implemented or deployed, and the target support package level comprises all of the support/enhancement packages that are available. A comparison between the current and target packages generates a delta list, which is a list of the support/enhancement packages that the customer does not have and thus needs to deploy. This determination can be handled on the customer's system by the software manager 130. The delta list can be placed into an xml file. While the required support/enhancement packages are known at this point, the affected objects of the software vendor are not.

The xml file is used by the software vendor to determine which software objects of the vendor will be affected by this customer's deployment. That is, which software objects will be affected by the support/enhancement packages that this customer needs, as is indicated in the delta list. This can be accomplished by examining a directory table, which includes a mapping between the needed support/enhancement packages and the vendor objects that will be affected. As noted in FIG. 1, a list of the affected objects can be placed in a support enhancement stack at 110, and this list is sent to the software manager 130 on the customer's system.

At this point, a file or log containing a list of the software vendor's objects that the customer has modified is read. This log is compared against the list of the affected files generated at 110 (list of objects that will be affected by the support/enhancement packages needed or required by this customer). This comparison results in a list of the vendor's software objects that have been modified by the customer that will be impacted by the support/enhancement deployment. In an embodiment, the customer can be provided with a tool that permits the customer to maintain its changes to the vendor's objects, or to simply accept the support enhancement package and overwrite the customer's modifications to the vendor's objects. If the customer chooses to overwrite its modifications to the vendor's objects, then in the vast majority of cases less work will be required by the customer in the deployment, and this along with other factors are taken into account in the estimation of the effort required to deploy the support/enhancement package. Alternatively, if the customer chooses to maintain its modifications to the vendor's objects, this will require a rework of the objects, which will of course affect the estimation of the effort required for this deployment. In either situation, the software vendor has personnel who have deployed support/enhancement packages with other customers (and perhaps even the current customer), and these personnel have a very good feel of the effort that will be needed to deploy this particular support/enhancement package in light of the just discussed factors (i.e., identification of the required packages from the delta list, customer modifications to vendor objects, maintaining or overwriting customer's modifications to vendor's objects, etc.). The estimated required effort can then be presented to the customer, so that the customer knows whether the effort required will take a week or several months, and whether the customer has the personnel required to meet the effort required by the deployment.

In a further embodiment, after the estimated effect and effort of the deployment on any customer modifications to the vendor's objects, a determination can be made as to the impact of the support/enhancement deployment on the customer's code developments, that is, software code written by the customer that is part of the overall customer system or landscape and that consequently interacts with the vendor objects. Since the affect of the deployment on the customer's custom code is more indirect, in many situations, while this analysis is helpful, it is not entirely essential, and in some situations can be omitted so as to save resources in the effort estimation effort. If the analysis is done, the results are presented to the customer along with the results of the impact on the customer modifications to the vendor's objects.

After the completion of the change impact 228 on the customer's modifications to the vendor's objects and the customer's custom code, and the re-work estimate 230 for the customer's modifications to the vendor's objects and the customer's custom code, the embodiment proceeds to the second phase at 240.

Figure 3:
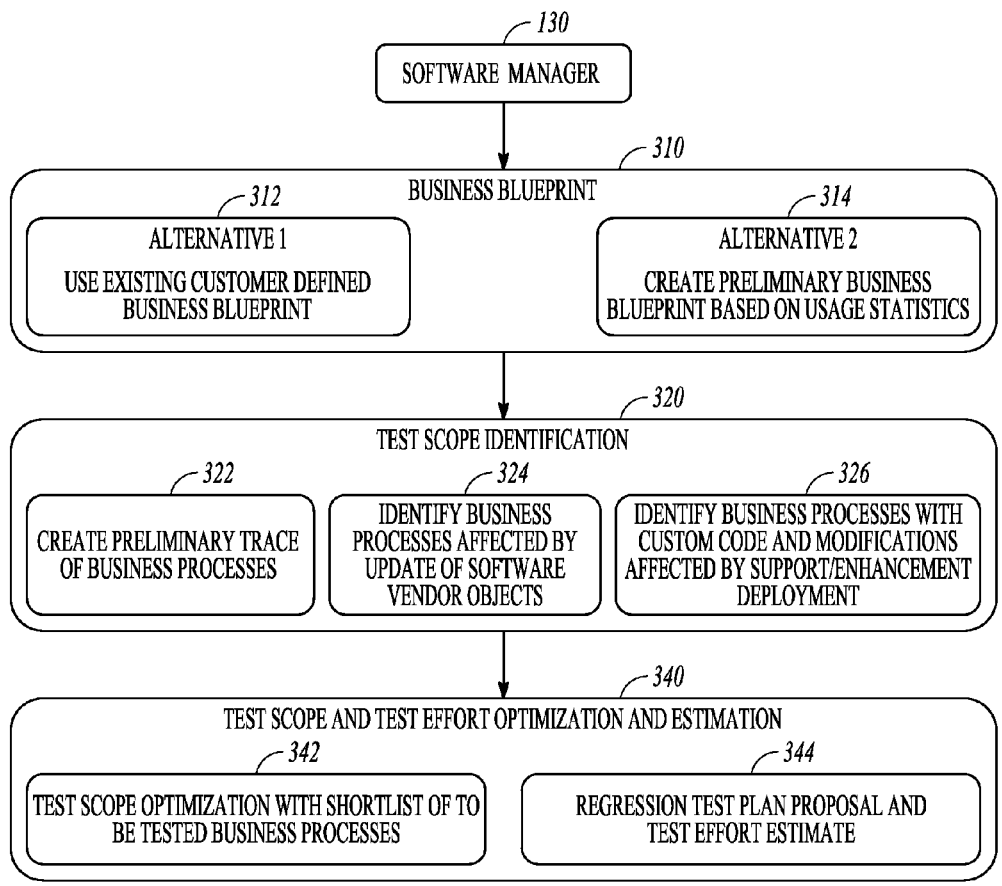
FIG. 3 is a block diagram of a second phase of a system that estimates the scope and effort involved in the deployment of a software support package and/or a software enhancement package.

The second phase 240 is illustrated in block diagram form in FIG. 3. It consists generally of creating or acquiring a business blueprint, and identifying the test scope with a focus on the customer's custom code and the customer's modifications to the software vendor's code. In an embodiment, the software vendor's software manager can manage the execution of the second phase. At 310, a business blueprint is provided and/or secured. If a customer business blueprint already exists for the customer, that existing customer business blueprint is used at 312. If a customer business blueprint does not already exist for the customer's system, one is created at 314 based on usage statistics of the customer system (these statistics can be kept by the software vendor and/or the customer). A business blueprint includes a hierarchy of business processes and related steps. For each process step additional information is stored such as the executable which represents the process step in the software of the software vendor. The process steps are suitable to store trace results that include all software objects used during execution of a process step in the vendor software or the custom code software.

At 320 in the second phase, the test scope of the support/enhancement package is identified. At 322, a preliminary trace of the customer's business processes is executed. This can be executed with a trace module referred to as a business process change analyzer. Such traces can be done in an online or batch mode. At 324, business processes that are affected by the updated objects of the software vendor are identified, and at 326, the business processes that include a customer's custom code and customer modifications to the software vendor's code and that are affected by the support/enhancement package are identified.

At 340 in the second phase, the test scope and test effort are optimized and estimated. The test scope optimization at 342 generates a shortlist of the business processes that need to be tested (as a result of the deployment of the support/enhancement package). And at 344, a regression test plan is proposed by the software vendor and the test effort is estimated.

More specifically, in an embodiment of the second phase, as noted, there are two cases. That is, either the customer already has a business blueprint, or the customer does not have a business blueprint. As previously noted, a business blueprint includes a list of the vendor's objects, process steps, and business transactions that are actually used (i.e., executed) by the customer. If the customer already has a business blueprint then that blueprint can be used in the second phase. If the customer does not have a business blueprint, a system processor can read a file that includes usage statistics of customer executables and create a basic blueprint structure based on the executables. The generation of the business blueprint can involve an examination of an application component hierarchy, that is, the usage statistics for different portions of the system such as sales, finance, marketing, or manufacturing. This analysis can result in a reduction in the test scope. For example, if an analysis of the business blueprint shows that the deployment will not affect the manufacturing side of the customer system as much as it affects the business side (sales, marketing, finance) of the system, the test scope can be adjusted accordingly. The resulting business blueprint analysis can be presented to the customer.

The system then, using the business blueprint, examines the executables and programs used in the executables. This analysis can be performed in a trace mode of the customer system. However, the trace mode takes a significant amount of processor time and system memory, and in some cases, overloads the system memory. So, in an embodiment, the trace mode consists of a batch job that is run to analyze the executables and the programs used in the executables. A comparison is made using the list of affected vendor objects and the list of executables to identify the affected process steps and/or executables. Then, the customer modified vendor objects that were previously identified as being affected by the deployment are used to determine the executables that use these customer modified vendor objects. Additionally, the customer's custom code that is affected by the deployment is identified. From this, it can be determined what vendor objects, executables, and customer custom code needs to be tested and to what extent. New tests can also be recommended to the customer at this point. As noted above, the customer can use this information to determine the resources (time and personnel) that will be needed for a deployment.

Figure 4A:
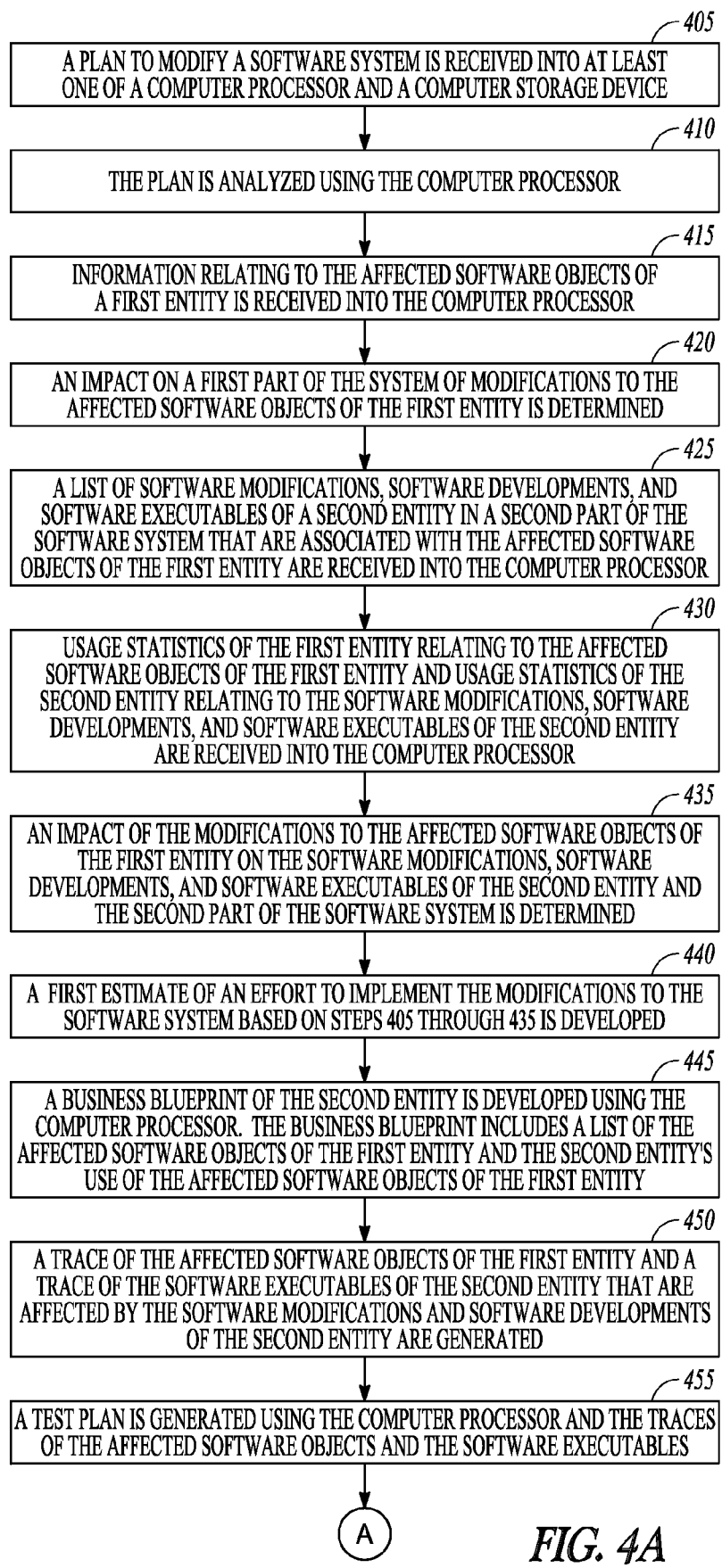
FIGS. 4A and 4B are a flowchart-like diagram of features and process steps of an example embodiment to estimate the scope and effort involved in the deployment of a software support package and/or a software enhancement package.
Figure 4B:
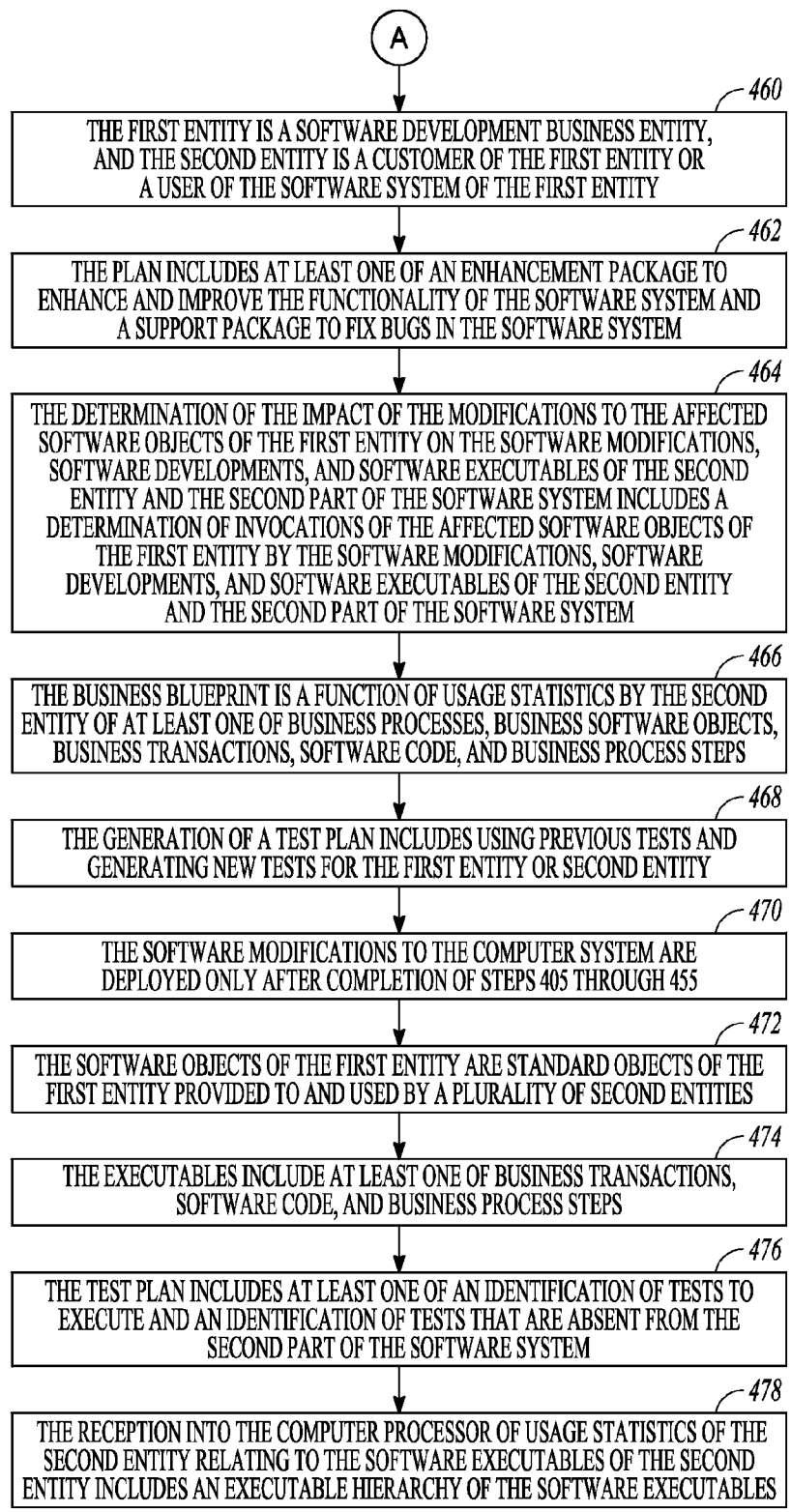

FIGS. 4A and 4B are a flowchart-like diagram 400 of features and process steps for estimating the scope and effort of software deployment. FIGS. 4A and 4B include a number of process blocks 405-478. Though arranged serially in the example of FIGS. 4A and 4B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through, the modules. Thus, any process flow is applicable to software, firmware, hardware, and hybrid implementations.

Referring to FIGS. 4A and 4B, at 405, a plan to modify a software system is received into at least one of a computer processor and a computer storage device. The software system includes a first pan that is developed, provided, and maintained by a first entity, and a second part that is developed and maintained by a second entity. In an embodiment, the first entity is a software development company, and the second entity is a customer of the software development company that purchases or leases the software of the software development company. At 410, the plan is analyzed using the computer processor. This analysis identifies software objects of the first entity that are affected by the plan to modify the software system. At 415, information, relating to the affected software objects of the first entity is received into the computer processor. This information can include the identification of databases that the objects use, other objects that the objects communicate with, and usage statistics for the objects. At 420, an impact on the first part of the system of modifications to the affected software objects of the first entity is determined. This is a vendor-centered analysis. That is, what resources will the vendor need to changes its objects. At 425, a list of software modifications, software developments, and software executables of the second entity in the second part of the software system that are associated with the affected software objects of the first entity are received into the computer processor. That is, how will the vendor's planned deployment of fixes and enhancements affect the customer's system, and in particular, any modifications the customer has made to copies of the vendor's objects and any code of the customer that interacts with the vendor's objects. At 430, usage statistics of the first entity relating to the affected software objects of the first entity and usage statistics of the second entity relating to the software modifications, software developments, and software executables of the second entity are received into the computer processor. As noted, in some vendor/customer relationships, a customer is allowed to modify a copy of the vendor's software so that it meets particular needs of the customer. In such situations, at 435, an impact of the modifications to the affected software objects of the first entity on the software modifications, software developments, and software executables of the second entity and the second part of the software system is determined. At 440, a first estimate of an effort to implement the modifications to the software system based on steps 405 through 435 is developed. This estimate is developed before the deployment of the software modifications.

At 445, a business blueprint of the second entity is developed using the computer processor. The business blueprint includes a list of the affected software objects of the first entity and the second entity's use of the affected software objects of the first entity. At 450, a trace of the affected software objects of the first entity and a trace of the software executables of the second entity that are affected by the software modifications and software developments of the second entity are generated. The trace can be done in an online/real time mode or in a batch mode. At 455, a test plan is generated using the computer processor and the traces of the affected software objects and the software executables. The test plan includes a list of affected software objects and software executables to be tested as a result of the change to the software system and a second estimate comprising an estimated effort to implement the test plan.

As noted, at 460, the first entity can be a software development business entity, and the second entity can be a customer of the first entity or a user of the software system of the first entity. At 462, the plan includes at least one of an enhancement package to enhance and improve the functionality of the software system and a support package to fix bugs in the software system. At 464, the determination of the impact of the modifications to the affected software objects of the first entity on the software modifications, software developments, and software executables of the second entity and the second part of the software system includes a determination of invocations of the affected software objects of the first entity by the software modifications, software developments, and software executables of the second entity and the second part of the software system. At 466, the business blueprint is a function of usage statistics by the second entity of at least one of business processes, business software objects, business transactions, software code, and business process steps. At 468, the generation of a test plan includes using previous tests and generating new tests for the first entity or second entity.

At 470, the software modifications to the computer system are deployed only after completion of steps 405 through 455. Consequently, before the deployment, both the software vendor and the customer are apprised of the effort and resources that will be required by the deployment. At 472, the software objects of the first entity are standard objects of the first entity provided to and used by a plurality of second entities. Standard objects of the first entity can be thought of as the basic products of the vendor that are offered for sale or lease to any customer or potential customer. At 474, the executables include at least one of business transactions, software code, and business process steps. Business process steps and business transactions are the functionalities that are implemented by the customer via the vendor's objects, such as sales invoicing or sales order tracking. At 476, the test plan includes at least one of an identification of tests to execute and an identification of tests that are absent from the second part of the software system. The vendor, who is more acquainted with his objects and products than the customer, and software systems in general, may discover some shortcomings in the customer's normal test plans. The deployment preparation and analysis allows the vendor to identify these shortcomings and suggest tests and procedures to address these shortcomings. At 478, the reception into the computer processor of usage statistics of the second entity relating to the software executables of the second entity includes an executable hierarchy of the software executables. The hierarchy of the executables may have an effect on the testing process. For example, an executable that is executed prior to one or more other executables should be tested and verified before testing any downstream executables.

Figure 5:
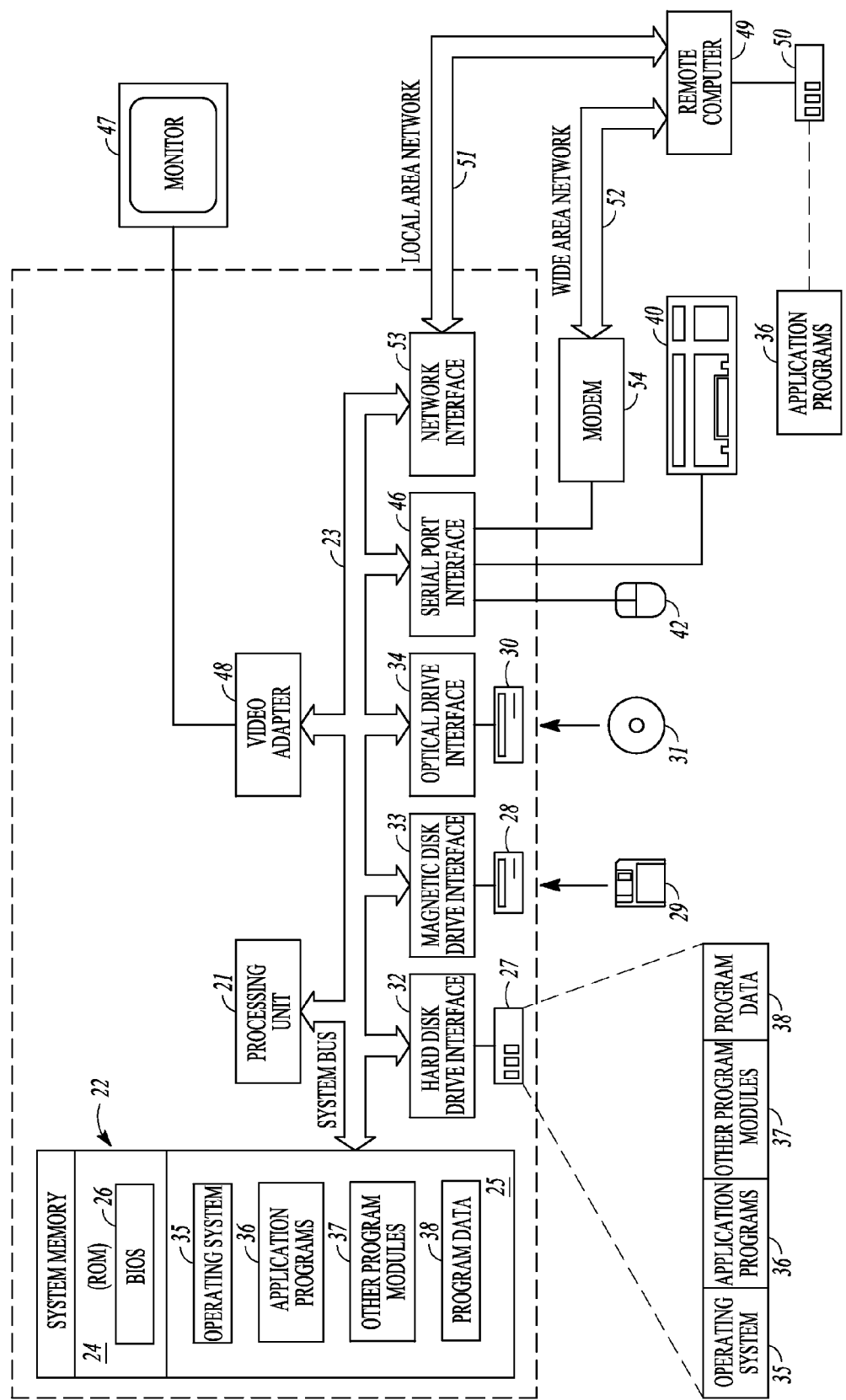
FIG. 5 is a block diagram of an example embodiment of a computer system upon which an embodiment of the present disclosure can execute.

FIG. 5 is an overview diagram of hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 38 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a pan of the computer 20; the invention is not limited to a particular type of communications device. Use remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:
1. A method comprising:
(a) receiving into a computer processor a plan to modify a software system, the software system comprising a first part developed, provided, and maintained by a first entity, and a second part developed and maintained by a second entity;
(b) analyzing the plan using the computer processor and identifying software objects of the first entity that are affected by the plan to modify the software system;
(c) receiving into the computer processor information relating to the affected software objects of the first entity;
(d) determining an impact on the first part of a system of modifications to the affected software objects of the first entity;

(e) receiving into the computer processor a list of software modifications, software developments, and software executables of the second entity in the second part of the software system that are associated with the affected software objects of the first entity;

(f) receiving into the computer processor usage statistics of the first entity relating to the affected software objects of the first entity and usage statistics of the second entity relating to the software modifications, software developments, and software executables of the second entity;

(g) determining an impact of the system of modifications to the affected software objects of the first entity on the software modifications, software developments, and software executables of the second entity and the second part of the software system;

(h) developing a first estimate of an effort to implement the system of modifications to the software system based on steps (a) through (g);

(i) developing using the computer processor a business blueprint of the second entity, the business blueprint comprising a list of the affected software objects of the first entity and the second entity's use of the affected software objects of the first entity;

(j) generating using the computer processor a trace of the affected software objects of the first entity and a trace of the software executables of the second entity that are affected by the software modifications and software developments of the second entity; and (k) generating a test plan using the computer processor and the traces of the affected software objects and the software executables, the test plan comprising a list of the affected software objects and the software executables to be tested as a result of the change to the software system and a second estimate comprising an estimated effort to implement the test plan.

2. The method of claim 1, wherein the first entity is a software development, business entity, and the second entity is a customer of the first entity or a user of the software system of the first entity.

3. The method of claim 1, wherein the plan comprises at least one of an enhancement package to enhance and improve the functionality of the software system and a support package to fix bugs in the software system.

4. The method of claim 1, wherein the determining an impact of the system of modifications to the affected software objects of the first entity on the software modifications, software developments, and software executables of the second entity and the second part of the software system comprises determining invocations of the affected software objects of the first entity by the software modifications, software developments, and software executables of the second entity and the second part of the software system.

5. The method of claim 1, wherein the business blueprint is a function of usage statistics by the second entity of at least one of business processes, business software objects, business transactions, software code, and business process steps.

6. The method of claim 1, wherein the generating a test plan comprises using previous tests and generating new tests for the first entity or the second entity.

7. The method of claim 1, comprising deploying the software modifications to the software system only after completion of steps (a) through (k).

8. The method of claim 1, wherein the software objects of the first entity are standard objects of the first entity provided to and used by a plurality of second entities.

9. The method of claim 1, wherein the software executables comprise at least one of business transactions, software code, and business process steps.

10. The method of claim 1, wherein the test plan comprises at least one of an identification of tests to execute and an identification of tests that are absent from the second part of the software system.

11. The method of claim 1, wherein the receiving into the computer processor of usage statistics of the second entity relating to the software executables of the second entity comprises an executable hierarchy of the software executables.

12. A non-transitory computer readable storage device comprising instructions that when executed by a processor execute a process comprising:

(a) receiving into at least one of a computer processor and a computer storage device a plan to modify a software system, the software system comprising a first part developed, provided, and maintained by a first entity, and a second part developed and maintained by a second entity;

(b) analyzing the plan using the computer processor and identifying software objects of the first entity that are affected by the plan to modify the software system;

(c) receiving into the computer processor information relating to the affected software objects of the first entity;

(d) determining an impact on the first part of a system of modifications to the affected software objects of the first entity;

(e) receiving into the computer processor a list of software modifications, software developments, and software executables of the second entity in the second part of the software system that are associated with the affected software objects of the first entity;

(f) receiving into the computer processor usage statistics of the first entity relating to the affected software objects of the first entity and usage statistics of the second entity relating to the software modifications, software developments, and software executables of the second entity;

(g) determining an impact of the system of modifications to the affected software objects of the first entity on the software modifications, software developments, and software executables of the second entity and the second part of the software system;

(h) developing a first estimate of an effort to implement the system of modifications to the software system based on steps (a) through (g);

(i) developing using the computer processor a business blueprint of the second entity, the business blueprint comprising a list of the affected software objects of the first entity and the second entity's use of the affected software objects of the first entity;

(j) generating using the computer processor a trace of the affected software objects of the first entity and a second trace of the software executables of the second entity that are affected by the software modifications and software developments of the second entity; and (k) generating a test plan using the computer processor and the trace of the affected software objects and the software executables, the test plan comprising a list of the affected software objects and the software executables to be tested as a result of the change to the software system and a second estimate comprising an estimated effort to implement the test plan.

13. The computer readable storage device of claim 12, wherein the first entity is a software development business entity, and the second entity is a customer of the first entity or a user of the software system of the first entity; and wherein the software objects of the first entity are standard objects of the first entity provided to and used by a plurality of second entities.

14. The computer readable storage device of claim 12, wherein the plan comprises at least one of an enhancement package to enhance and improve the functionality of the software system and a support package to fix bugs in the software system.

15. The computer readable storage device of claim 12, wherein the determining an impact of the system of modifications to the affected software objects of the first entity on the software modifications, software developments, and software executables of the second entity and the second part of the software system comprises determining invocations of the affected software objects of the first entity by the software modifications, software developments, and software executables of the second entity and the second part of the software system.

16. The computer readable storage device of claim 12, comprising instructions for deploying the software modifications to the software system only after completion of steps (a) through (k).

17. A system comprising:
  a computer processor and a computer storage device configured to:
  (a) receiving into at least one of a computer processor and a computer storage device a plan to modify a software system, the software system comprising a first part developed, provided, and maintained by a first entity, and a second part developed and maintained by a second entity;
  (b) analyzing the plan using the computer processor and identifying software objects of the first entity that are affected by the plan to modify the software system;
  (c) receiving into the computer processor information relating to the affected software objects of the first entity;
  (d) determining an impact on the first part of a system of modifications to the affected software objects of the first entity;
  (e) receiving into the computer processor a list of software modifications, software developments, and software executables of the second entity in the second part of the software system that are associated with the affected software objects of the first entity;
  (f) receiving into the computer processor usage statistics of the first entity relating to the affected software objects of the first entity and usage statistics of the second entity relating to the software modifications, software developments, and software executables of the second entity;
  (g) determining an impact of the system of modifications to the affected software objects of the first entity on the software modifications, software developments, and software executables of the second entity and the second part of the software system;
  (h) developing a first estimate of an effort to implement the system of modifications to the software system based on steps (a) through (g);
  (i) developing using the computer processor a business blueprint of the second entity, the business blueprint comprising a list of the affected software objects of the first entity and the second entity's use of the affected software objects of the first entity;
  (j) generating using the computer processor a trace of the affected software objects of the first entity and a trace of the software executables of the second entity that are affected by the software modifications and software developments of the second entity; and
  (k) generating a test plan using the computer processor and the trace of the affected software objects and the software executables, the test plan comprising a list of the affected software objects and the software executables to be tested as a result of the change to the software system and a second estimate comprising an estimated effort to implement the test plan.

18. The system of claim 17, wherein the first entity is a software development business entity, and the second entity is a customer of the first entity or a user of the software system of the first entity; and wherein the software objects of the first entity are standard objects of the first entity provided to and used by a plurality of second entities.

19. The system of claim 17, wherein the determining an impact of the system of modifications to the affected software objects of the first entity on the software modifications, software developments, and software executables of the second entity and the second part of the software system comprises determining invocations of the affected software objects of the first entity by the software modifications, software developments, and software executables of the second entity and the second part of the software system.

20. The system of claim 17, comprising a computer processor configured to deploy the software modifications to the software system only after completion of steps (a) through (k).

* * * * *